United States Patent
Ahirwar et al.

(10) Patent No.: US 12,401,552 B2
(45) Date of Patent: Aug. 26, 2025

(54) INTERFERENCE CANCELLATION IN A MULTI-RADIO SYSTEM AND APPARATUS FOR CANCELLATION

(71) Applicant: NXP USA, Inc., Austin, TX (US)

(72) Inventors: Vijay Ahirwar, Pune (IN); Nilesh Nilkanth Khude, Pune (IN); Hari Ram Balakrishnan, Chennai (IN); Sudhir Srinivasa, Los Gatos, CA (US); Olivier Jerome Celestin Jamin, Sainte Honorine du Fay (FR)

(73) Assignee: NXP USA, Inc., Austin, TX (US)

( * ) Notice: Subject to any disclaimer, the term of this patent is extended or adjusted under 35 U.S.C. 154(b) by 238 days.

(21) Appl. No.: 18/152,817

(22) Filed: Jan. 11, 2023

(65) Prior Publication Data

US 2024/0171430 A1    May 23, 2024

(30) Foreign Application Priority Data

Nov. 17, 2022   (IN) ........................... 202221066012

(51) Int. Cl.
*H04L 25/08* (2006.01)
*H04B 7/0413* (2017.01)

(52) U.S. Cl.
CPC .......... *H04L 25/08* (2013.01); *H04B 7/0413* (2013.01)

(58) Field of Classification Search
CPC ........... H04B 1/715; H04B 2001/7154; H04B 7/0413; H04L 5/0062; H04L 25/08; H04W 72/541; H04W 88/06
See application file for complete search history.

(56) References Cited

U.S. PATENT DOCUMENTS

| | | | |
|---|---|---|---|
| 5,576,652 A * | 11/1996 | Boehlke | H03H 17/08 327/175 |
| 10,804,943 B2 | 10/2020 | Hahn et al. | |
| 11,152,966 B1 * | 10/2021 | Oyman | H04J 11/004 |
| 11,196,455 B1 * | 12/2021 | Chen | H04B 1/715 |
| 2010/0029204 A1 | 2/2010 | Gao et al. | |
| 2011/0124307 A1 * | 5/2011 | Balankutty | H04B 1/12 455/296 |
| 2011/0241847 A1 * | 10/2011 | Baruco | B60R 25/245 340/12.5 |
| 2012/0201173 A1 * | 8/2012 | Jain | H04B 1/56 370/277 |

(Continued)

OTHER PUBLICATIONS

Lauri Anttila, Dani Korpi, Emilio Antonio-Rodr'iguez, Risto Wichman, and Mikko Valkama, "Modeling and Efficient Cancellation of Nonlinear Self-Interference in MIMO Full-Duplex Transceivers", Tampere University of Technology, Finland, Oct. 10, 2014 (Year: 2014).*

(Continued)

*Primary Examiner* — Aristocratis Fotakis

(57) ABSTRACT

A multi-radio system comprises a first radio and a second radio co-located on the multi-radio system. The first radio is arranged to generate an RF transmit signal which is output by a first antenna of the first radio. In an example, the first radio comprises a radio frequency (RF) canceller arranged to output a RF cancellation signal which couples with the RF transmit signal received at a second antenna of the second radio. The RF cancellation signal that is output results in the cancellation of the RF transmit signal at the second antenna of the second radio.

18 Claims, 5 Drawing Sheets

(56) References Cited

U.S. PATENT DOCUMENTS

| | | | | |
|---|---|---|---|---|
| 2013/0301487 A1* | 11/2013 | Khandani | ............ | H04B 7/0413 |
| | | | | 370/278 |
| 2013/0308732 A1* | 11/2013 | Kpodzo | ................... | H04K 3/20 |
| | | | | 375/346 |
| 2014/0187276 A1* | 7/2014 | Cyzs | .................... | H04J 11/0023 |
| | | | | 455/501 |
| 2017/0279589 A1* | 9/2017 | Zhao | ........................ | H04B 1/54 |
| 2018/0007718 A1* | 1/2018 | Tujkovic | ............... | H04W 76/10 |
| 2020/0136660 A1* | 4/2020 | Behzad | ................ | H04B 1/0475 |

OTHER PUBLICATIONS

Ahmed et al. "Self-Interference cancellation with nonlinear distortion suppression for full duplex systems", Nov. 2013, Asilomar conference on signals, systems and computers. 5 pages.

* cited by examiner

INTERFERENCE CANCELLATION IN A MULTI-RADIO SYSTEM AND APPARATUS FOR CANCELLATION

FIELD OF THE DISCLOSURE

This disclosure generally relates to interference cancellation, and more particularly to cancellation of interference from an aggressor radio of a multi-radio system at a victim radio of the multi-radio system based on a cancellation signal provided to the victim radio.

BACKGROUND

A multi-radio system has two or more radios which are co-located on a single integrated circuit or a plurality of integrated circuits. Each radio transmits and receives signals in accordance with a different wireless protocol such as Bluetooth for one radio and WiFi for another radio in an example. A radio which transmits a signal and another radio which transmits or receives a signal at a same time in the multi-radio system is referred to as an aggressor radio and victim radio, respectively. The signal received by the victim radio is subject to gain drops and saturation caused by interference from the signal transmitted by the aggressor radio. Additionally or alternatively, the signal transmitted by the victim radio includes spurious spectrum components resulting from intermodulation with the signal transmitted by the aggressor radio which cause out of band emissions which may violate regulatory specifications. To avoid interference between the radios, a time when the victim radio and aggressor radio transmits a signal or when an aggressor radio transmits a signal and a victim radio receives a signal is typically controlled so that the radios do not operate at a same time.

Figure 1:
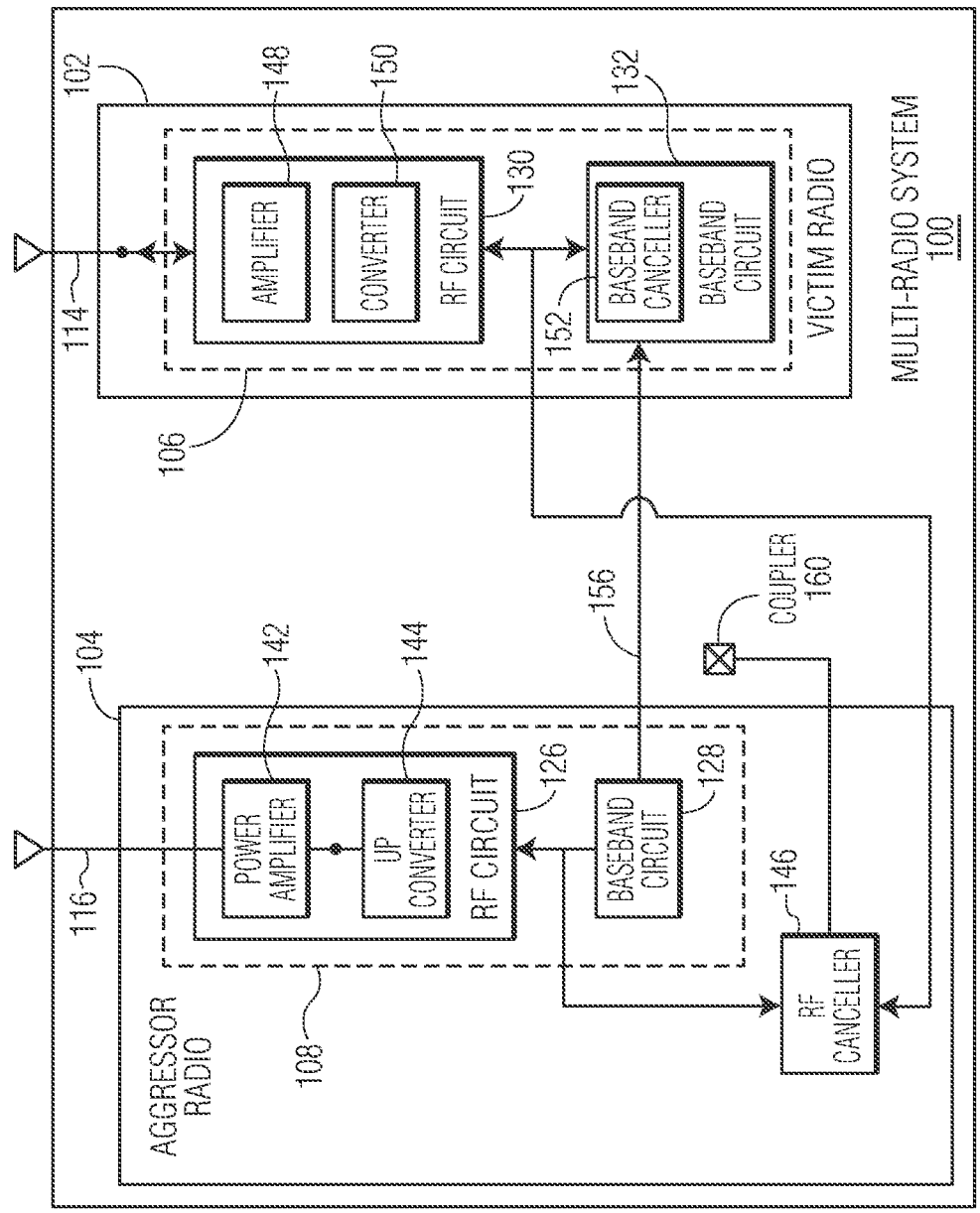
FIG. 1 is a block diagram of an example multi-radio system arranged with interference cancellation at a radio in accordance with an embodiment.

The drawings are for the purpose of illustrating example embodiments, but it is understood that the embodiments are not limited to the arrangements and instrumentality shown in the drawings.

DETAILED DESCRIPTION OF EMBODIMENTS

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

Embodiments disclosed herein are directed to interference cancellation, and more particularly to cancellation of interference from an aggressor radio of a multi-radio system at a victim radio of the multi-radio system based on a cancellation signal provided to the victim radio. The multi-radio system is a single chip, multiple chips, a board, or a platform in an example. The aggressor radio has a radio frequency (RF) canceller. The RF canceller generates an RF cancellation signal which is coupled to the victim radio. The RF cancellation signal has one or more of a phase and amplitude which cancels at an antenna of the victim radio a radio frequency (RF) transmit signal transmitted by the aggressor radio. The RF cancellation signal might not cancel spurious spectrum components in a signal bandwidth at the victim radio caused by the RF transmit signal transmitted by the aggressor radio, referred to as aggressor transmit nonlinearity. To cancel this aggressor transmit nonlinearity, the victim radio has a baseband canceller which adjusts a baseband transmit signal of the aggressor radio by a model which models transmit nonlinearity of the aggressor radio and the adjusted baseband transmit signal is subtracted from a baseband signal of the victim radio which is then transmitted as an RF signal by the victim radio. Well known instructions, protocols, structures, and techniques have not been shown in detail in order not to obfuscate the description.

Example Systems

FIG. 1 is a block diagram of an example multi-radio system 100 arranged with interference cancellation at a radio in accordance with an embodiment. The multi-radio system 100 may have two or more radios such as radio 102 and radio 104 that operate in accordance with a wireless standard and which are implemented in an integrated circuit (IC), a plurality of integrated circuits, a board, or a platform of a wireless system. In an example, one wireless radio may be a Bluetooth radio and another wireless radio may be a WiFi radio. Bluetooth is a wireless technology standard that is used for exchanging data between devices over a short distance. The Institute of Electrical and Electronics Engineers (IEEE) standardized Bluetooth as IEEE 802.15.1. WiFi is a family of wireless network protocols, based on the IEEE 802.11 family of standards, which are commonly used for local area networking of devices and Internet access, allowing nearby digital devices to exchange data by radio waves. The multi-radio system 100 may have circuitry such as one or more of analog circuitry, mix signal circuitry, memory circuitry, logic circuitry, and processing circuitry that executes code stored in a memory that when executed by the processing circuitry performs the disclosed functions, among other implementations.

The radio 102 and radio 104 may have a respective communication circuit 106 and communication circuit 108 for transmitting or receiving signals via a respective antenna 114 and antenna 116. In an example, the communication circuit 108 may be a transmitter which transmits signals via the antenna 116 in accordance with a standard and the communication circuit 106 may be a transmitter which transmits signals via the antenna 114 in accordance with a standard or a receiver which receives signals via the antenna 114 in accordance with a standard. The communication circuit 108 arranged as a transmitter may have the antenna 116 arranged as a transmit antenna, a radio frequency (RF) circuit 126 arranged to process signals at RF, and a baseband circuit 128 arranged to process signals at a baseband frequency, among other circuits. The RF circuit 126 may include an upconverter 144 and a power amplifier 142. The upconverter 144 may receive a baseband transmit signal from the baseband circuit 128 at a baseband frequency and upconvert the baseband transmit signal to an RF transmit signal which is modulated at an RF frequency for wireless transmission over an air interface by the antenna 116. The power amplifier 142 may receive the RF transmit signal and amplify the RF transmit signal for transmission over the antenna 116. The communication circuit 106 may also have the antenna 114, an RF circuit 130, and a baseband circuit 132, among other circuitry. The RF circuit 130 may have an amplifier 148 which is a low noise amplifier (LNA) to amplify the RF receive signal received over the antenna 114 when the communication circuit 106 is arranged as a receiver and which is a power amplifier (PA) to amplify an RF signal which is to be transmitted over the antenna 114 when the communication circuit 106 is arranged as a transmitter. Further, the RF circuit 130 may have a converter 150 which downconverts a RF receive signal at an RF frequency to a baseband receive signal at a baseband frequency when the communication circuit 106 is arranged as receiver or upconverts a baseband transmit signal from the baseband circuit 132 to an RF transmit signal when the communication circuit 106 is arranged as a transmitter.

In an example, the radio 104 may transmit an RF transmit signal over the antenna 116 which interferes with reception of an RF receive signal received by the radio 102 from a remote station (not shown) over the antenna 114 or transmission of a RF transmit signal by the radio 102 over the antenna 114. The radio 104 of the multi-radio system 100 which transmits a signal over its antenna 116 may be an aggressor radio 104 which transmits a signal. The radio 102 of the multi-radio system 100 which receives the RF transmit signal from the radio 104 over its antenna 114 or transmits an RF transmit signal over the antenna 114 with which the RF transmit signal from radio 104 interferes may be a victim radio 102.

Embodiments disclosed herein are directed to interference cancellation, and more particularly to cancellation of interference from the aggressor radio 104 of the multi-radio system 100 at the victim radio 102 of the multi-radio system 100 based on a cancellation signal provided to the victim radio 102. The aggressor radio 104 has a radio frequency (RF) cancellation circuit 146. The RF canceller 146 may receive the baseband transmit signal from the baseband circuit 128 of the aggressor radio 104 and baseband transmit signal or baseband receive signal of the victim radio 102 and generate an RF cancellation signal which is coupled by a coupler 160 to the receive antenna 114 of the victim radio 102. The coupler 160 may be an auxiliary antenna of the aggressor radio 104 and the coupling at the victim antenna 114 is through an over-the-air path between the auxiliary antenna and the victim antenna 114. In some embodiments the coupler 160 may be a RF circuit component such as a transformer or a Balun to actively couple the cancellation signal to the victim antenna 114. In an example, the auxiliary antenna may be a dedicated antenna in the multi-radio system 100 to transmit the RF cancellation signal or an antenna of a third radio of the multi-radio system which is not active when the RF cancellation signal is transmitted. In another example, the auxiliary antenna may be an antenna of a multi-input multi-output antenna (MIMO) array having a plurality of antenna. When the auxiliary antenna of the MIMO array is not being used for transmitting or receiving data signals by a radio, the auxiliary antenna may transmit the RF cancellation signal. The RF cancellation signal which has a phase and amplitude is arranged to cancel at the antenna 114 of the victim radio 102 the RF transmit signal transmitted by the aggressor radio 104 which interferes with an RF receive signal or RF transmit signal of the radio 102.

In some examples, an RF signal at the victim radio 102 may still include interference from the RF transmit signal of the aggressor radio 104 because the RF cancellation signal may not be able to cancel spurious spectrum components in a signal bandwidth at the victim radio 102 caused by the RF transmit signal transmitted by the aggressor radio 104, referred to as aggressor transmit nonlinearity. A baseband canceller 152 may adjust a baseband transmit signal 156 from the baseband circuit 128 of the radio 104 by a model of the aggressor transmit nonlinearity and an adjusted baseband transmit signal is subtracted from a baseband transmit signal of the victim radio 102 to cancel the aggressor transmit non-linearity. The aggressor transmit non-linearity is canceled in an analog domain or in a digital domain.

Figure 2:
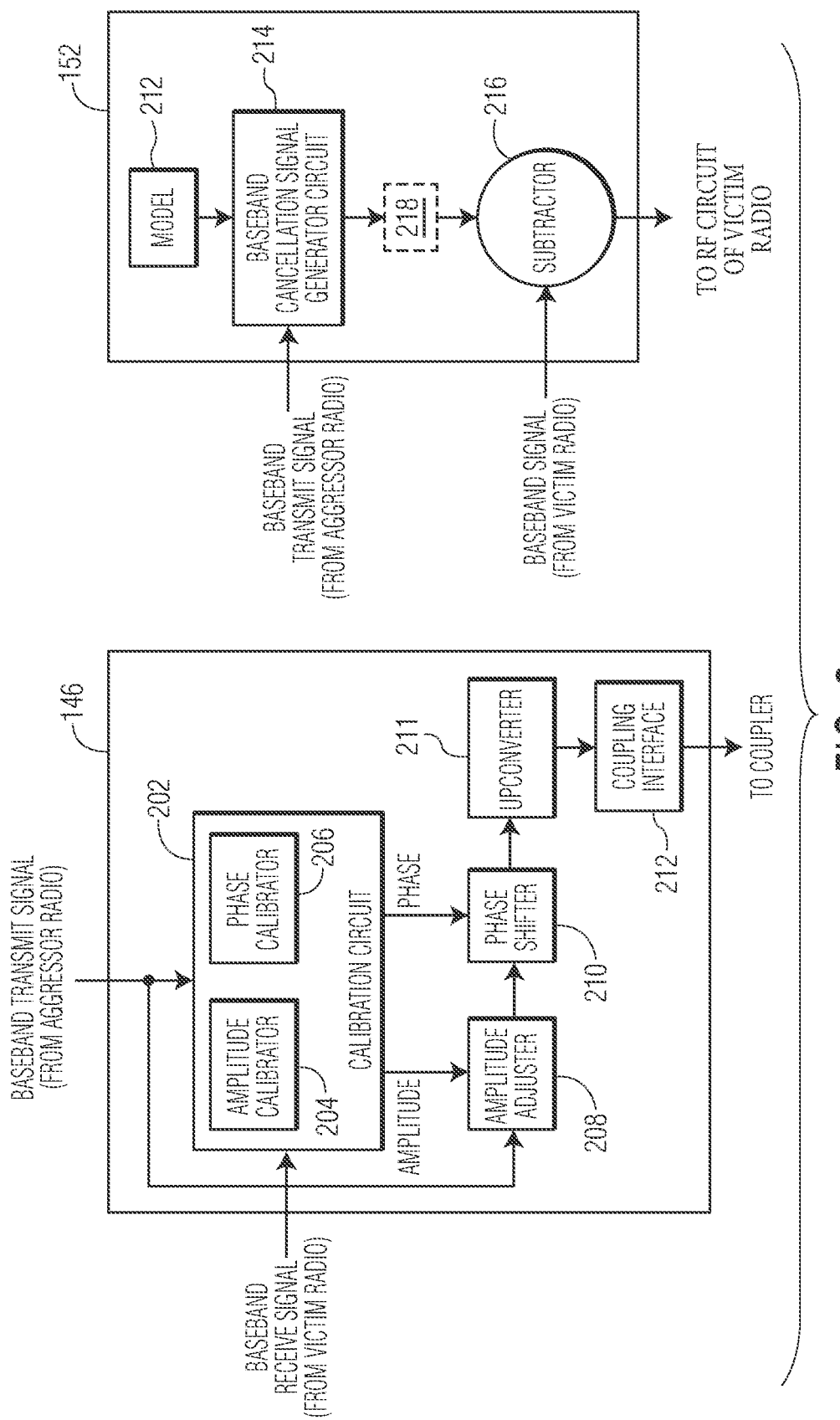
FIG. 2 is a block diagram of an RF canceller and baseband canceller of the multi-radio system in accordance with an embodiment.

FIG. 2 is a block diagram of the RF canceller 146 and the baseband canceller 152 of the multi-radio system 100 in accordance with an embodiment. The RF canceller 146 and the baseband canceller 152 may cancel interference from an RF transmit signal of the aggressor radio 104 at the victim radio. The RF canceller 146 and the baseband canceller 152 may have circuitry such as one or more of analog circuitry, mix signal circuitry, memory circuitry, logic circuitry, and processing circuitry that executes code stored in a memory that when executed by the processing circuitry performs the disclosed functions, among other implementations.

In an example, the RF canceller 146 may receive the baseband transmit signal from the aggressor radio 104 and an amplitude and phase of the baseband transmit signal from the aggressor radio 104 is adjusted by an amplitude adjuster 208 and a phase shifter 210. An amount by which the amplitude and phase is adjusted may be determined by a calibration circuit 202 during a calibration process as described in more detail below. The adjusted baseband transmit signal may be then be upconverted from a baseband frequency to an RF frequency by upconverter 211 and output as the RF cancellation signal to a coupling interface 212 and to the coupler 160. The coupler 160 may be a transformer, balun, or antenna to couple the RF cancellation signal to the victim radio 102 to cancel the RF transmit signal at the antenna 114. In the case the coupler 160 is an antenna, an isolation between the coupler 160 and the antenna 114 of the victim radio 102 may be low and an isolation between the antenna 116 of the aggressor radio 104 and the antenna 114 of the victim radio 102 may be high. If the isolation is high, then signals transmitted from the antenna 116 and received at the antenna 114 (and vice versa) are strongly attenuated. If the isolation is low, then signals transmitted from the coupler 160 and received at the antenna 114 (and vice versa) are weakly attenuated. The RF cancellation signal may reduce gain drops of a signal received by the victim radio 102 and transmit spectrum degradation when the victim radio 102 is arranged to transmit signals. Further, the RF cancellation signal may be transmitted at a power such that it matches the requirement of canceller signal amplitude and phase at the victim RF circuit 130 and simultaneously ensuring that it does not cause any unintentional beamforming at the aggressor radio 104.

The calibration circuit 202 may determine the amplitude and phase of the RF cancelation signal during the calibration process. The calibration process may comprise the aggressor radio 104 transmitting an RF transmit signal and a phase calibrator 204 and amplitude calibrator 206 determining the phase and amplitude, respectively, of the RF cancellation signal to cancel interference resulting from the aggressor radio 104 transmitting the RF transmit signal.

The amplitude may be determined based on the aggressor radio 104 transmitting an RF transmit signal and the victim radio 102 receiving the RF transmit signal and generating a baseband receive signal based on the received RF transmit signal at the victim radio 102 which is provided to the calibration circuit 202. The amplitude calibrator 204 may further receive this baseband receive signal and determine a power of the baseband receive signal. In an example, the power may be indicated by a mean square value of the baseband receive signal. The indication of power may be then scaled by 1/G where G is a gain of the communication circuit 106 of the victim radio 102 from the antenna 114 to the baseband circuit 132 arranged as a receiver to determine the amplitude of the RF transmit signal at the antenna 114. An amplitude of the RF cancellation signal may be this determined amplitude. In an example, one or more of the amplitude adjuster 208, phase shifter 210, upconverter 211, coupling interface 212, and coupler 160 may be disabled during the determination of the amplitude of the RF cancellation signal such that no RF cancellation signal is coupled to the antenna 114 during this determination.

The coupler 160 may be enabled during the determination of the phase of the RF cancellation signal to couple an RF cancellation signal to the antenna 114. An amplitude adjuster 208 may receive the baseband transmit signal from the aggressor radio 104 and an indication of the determined amplitude of the RF cancellation signal and output the baseband transmit signal with the determined amplitude. A phase calibrator 206 may determine a phase of the baseband transmit signal with the determined amplitude which is used to generate the RF cancellation signal. The baseband cancellation signal may be represented as cos(wt+g(t)+p) where phase of the baseband cancellation signal is a function of frequency w, time t, and a function g in an example. The phase calibrator 206 may provide an indication of a phase adjustment p to a phase shifter 210 which adjusts the phase of the baseband cancellation signal output by the phase shifter 210. The baseband cancellation signal is then provided to the upconverter 211 to form the RF cancellation signal and to the coupling interface 212 and output by the coupler 160. The phase calibration circuit 206 may determine a power of the baseband receive signal at the victim radio 102 when the RF cancellation signal with the amplitude and phase is received with the RF transmit signal from the aggressor radio 104 and the radio 104 outputs the RF transmit signal corresponding to the baseband transmit signal. This process may be repeated for different phase adjustment until a value of the phase p is identified which causes a power of the baseband receive signal at the victim radio 102 to be below a threshold amount. In an example, the phase shifter 210 and upconverter 211 may be a phase locked loop (PLL) arranged to receive the signal from amplitude adjuster 208 and shift a phase of the baseband transmit signal by one or more degrees at a time based on the indication from the phase calibrator and upconvert the shifted signal to RF.

In an example, the calibration circuit 202 may provide the identified phase p which causes a power of the baseband receive signal at the victim radio 102 to be below a threshold amount to the phase shifter 210 and the determined amplitude to the amplitude adjuster 206. The baseband cancellation signal may be generated based on adjusting the phase of the baseband transmit signal transmitted by the aggressor radio 104 by the identified phase and the amplitude of the baseband transmit signal to the determined amplitude during normal operation of the multi-radio system 100. The baseband cancellation signal is upconverted to an RF cancellation signal by the upconverter 211 and provided to the coupler interface 204 to cause the RF cancellation signal to be coupled to the antenna 114 of the victim radio 102.

In some examples, the victim radio 102 may have a plurality of antenna. The RF cancelation signal may optimally cancel the RF transmit signal at one antenna of the plurality and simultaneously cancel the RF transmit signal suboptimally at the other antenna of the plurality. Alternatively, the RF cancelation signal may suboptimally cancel the RF transmit signal at the plurality of antenna of the victim radio 102. Improvement of receiver sensitivity may depend on a positioning of an antenna which outputs the RF cancellation signal with respect to the plurality of antenna.

The RF transmit signal from the aggressor radio 104 may be on an adjacent frequency band to a signal received or transmitted by the victim radio 102. The RF canceller 160 may not be able to sufficiently cancel the RF transmit signal from the RF transmit signal transmitted by the victim radio 102 due to intermodulation products which manifests as side lobes and spurious noise in a frequency domain due to nonlinearities in the RF circuit 136. The baseband canceller 152 may cancel these intermodulation products, referred to as aggressor transmit nonlinearities.

The baseband canceller 152 may have a transmit nonlinearity model 212 and a baseband cancellation signal generator 214. The baseband canceller 152 may receive a baseband transmit signal from the baseband circuit 128 of the aggressor radio 104. The baseband transmit signal may be representative of the RF transmit signal of the radio 102 before being upconverted to an RF frequency. The transmit nonlinearity model 212 may model the transmit nonlinearity of the aggressor radio 104. For example, the transmit nonlinearity may be modeled as an AM-AM or AM-PM profile determined by a transmit digital predistortion (DPD) algorithm. The AM-AM profile may describe amplitude variation (AM) of a signal input to the RF circuit 126 and transmitted by the antenna 116 due to transmit nonlinearity caused by inherent amplitude variation (AM) of the signal. The AM-PM profile may describe phase variation (PM) of an AM signal input to the RF circuit 126 and transmitted by the antenna 116 due to transmit nonlinearity caused by inherent amplitude variation (AM) of the signal. The baseband cancellation signal generator circuit 214 may receive the model 212 and the baseband transmit signal from the radio 104 and define the baseband cancellation signal as the baseband transmit signal modified to include the nonlinearities of the RF circuit 126 indicated by the model 212. The baseband cancellation signal may be provided to a subtractor 216 which subtracts the baseband cancellation signal from the baseband transmit signal of the victim radio 102 to cancel the RF transmit signal with the aggressor transmit nonlinearity at the antenna 114. A result of the subtraction is output by the baseband circuit 152 which is provided to the RF circuit 130 arranged as a transmitter for transmission.

In some examples, a high pass filter 218 may optionally filter the baseband cancellation signal from the baseband cancellation signal generator circuit 214. The high pass filter 218 which results in a low frequency filtering of the RF transmit signal is illustrated by a dotted box to indicate its optional nature and is performed only when RF cancellation is already performed by the RF canceller 146. Further, the filtered baseband transmit signal may be provided to the subtractor 216 to cancel the aggressor transmit nonlinearity at the antenna 114.

Figure 3A:
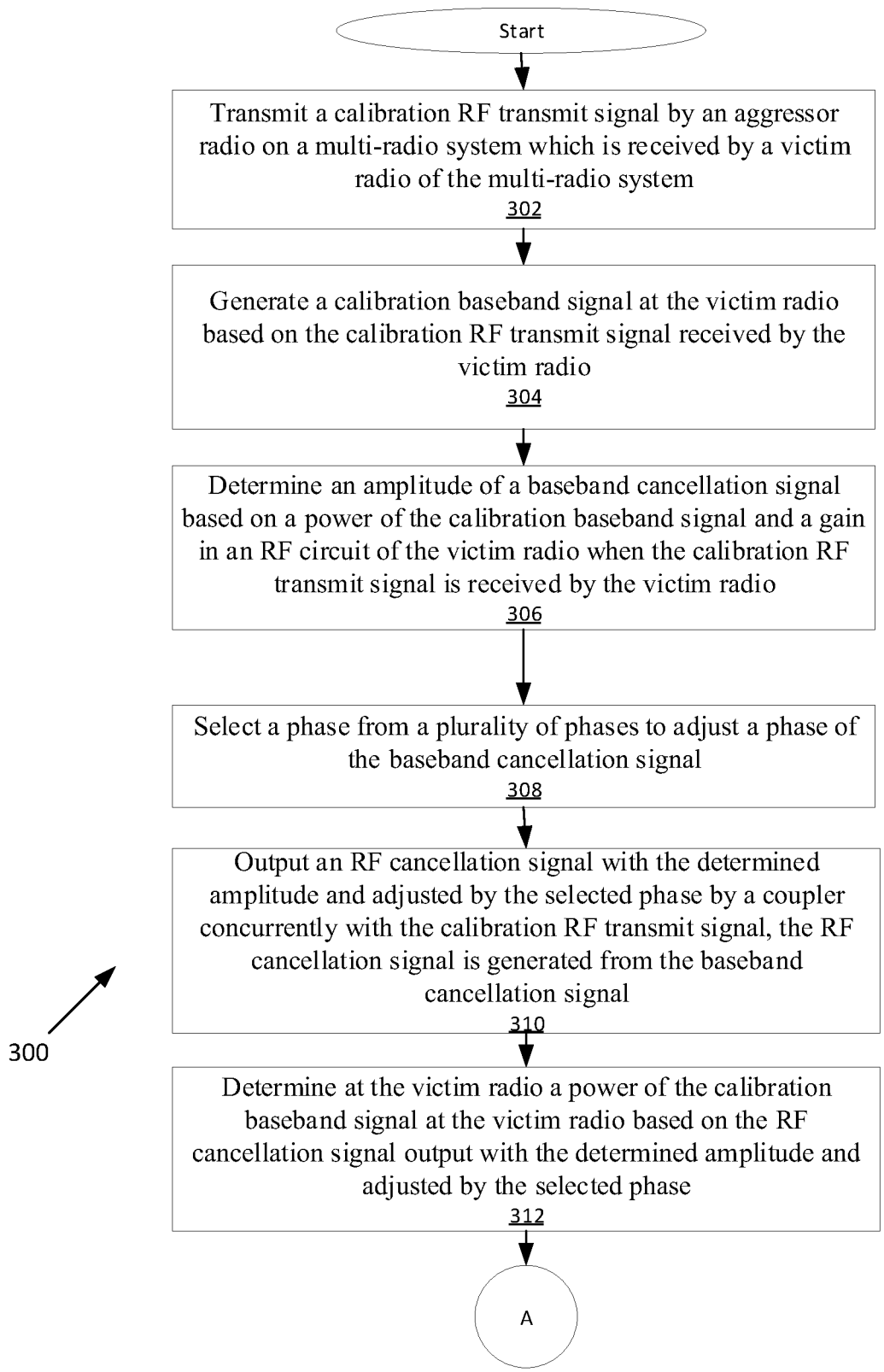
FIGS. 3A and 3B illustrate a flow chart of example processing associated with RF interference cancellation in accordance with an embodiment.
Figure 3B:
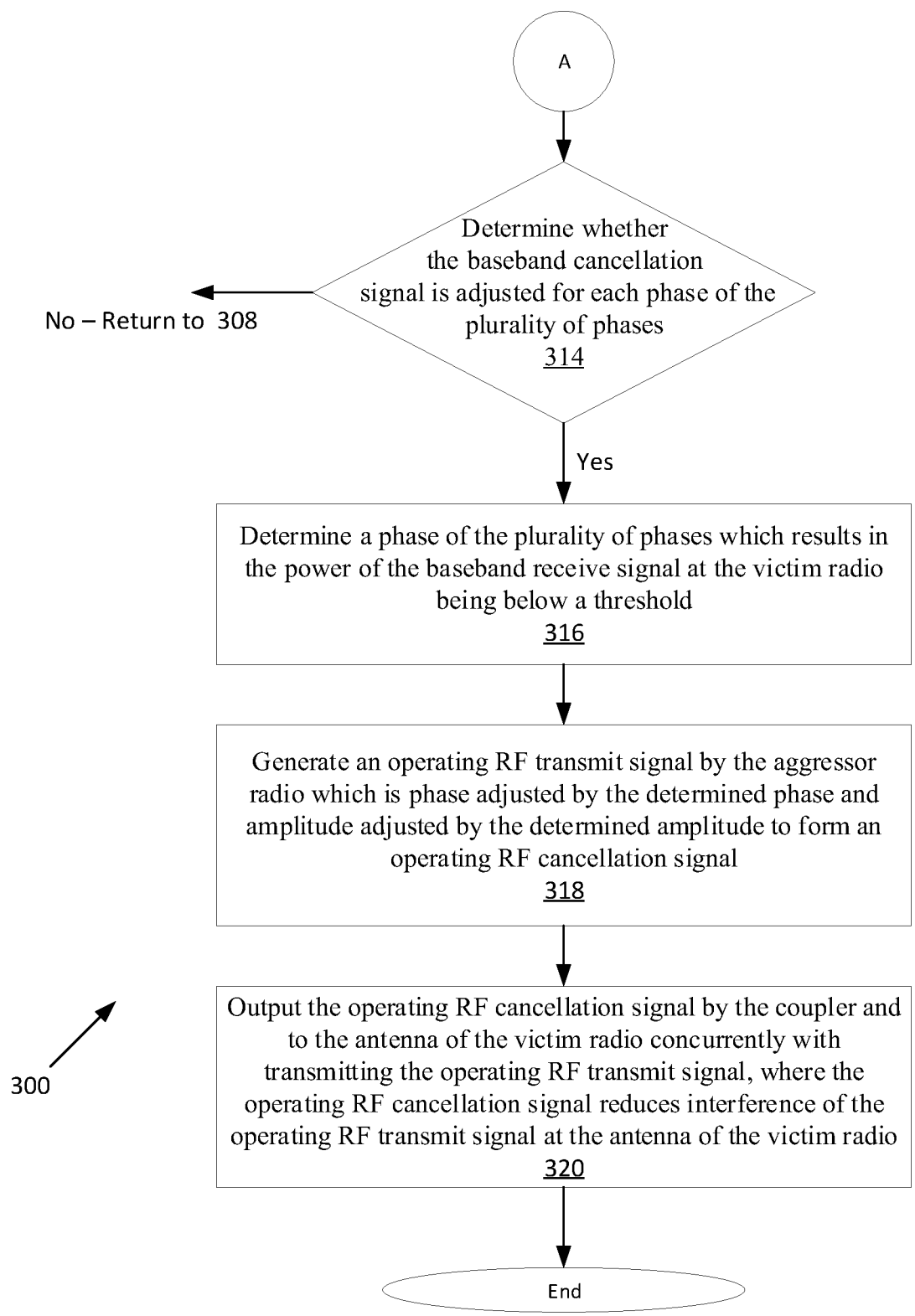

FIGS. 3A & 3B illustrate an flow chart 300 of example RF processing associated with interference cancellation in accordance with an embodiment. The RF processing may include various modes of operation including an amplitude calibration mode for determining an amplitude of the RF cancellation signal, a phase calibration mode for determining a phase of the RF cancellation signal, and an operating mode. In the operating mode, the aggressor radio 104 and the victim radio 104 may transmit or receive data signals associated with normal operation different from the calibration modes and an RF cancellation signal is output by the coupler 160 to reduce interference by the aggressor radio 104.

At 302, a calibration RF transmit signal is transmitted by an aggressor radio of a multi-radio system which is received by a victim radio of the multi-radio system. The calibration RF transmit signal may be an RF signal used to determine an amplitude of an RF cancellation signal during calibration unlike an operating RF transmit signal which is an RF signal which carries data to be transmitted to a remote station. At 304, a calibration baseband signal is generated at the victim radio based on the calibration RF transmit signal received by the victim radio. The calibration baseband signal may be a baseband signal generated by the victim radio based on reception of the calibration RF transmit signal. At 306, an amplitude of a baseband cancellation signal is determined based on a power of the calibration baseband signal and a gain in an RF circuit of the victim radio when the calibration RF transmit signal is received by the victim radio. At 308, a phase is selected from a plurality of phases to adjust a phase of the baseband cancellation signal. At 310, an RF cancellation signal with the determined amplitude and adjusted by the selected phase is output by a coupler 160 concurrently with the calibration RF transmit signal, where the RF cancellation signal is generated from the baseband cancellation signal. The RF cancellation signal may be the baseband cancellation signal adjusted by the selected phase and amplitude which is upconverted to RF. At 312, a power of the calibration baseband signal at the victim radio based on the RF cancellation signal output with the determined amplitude and adjusted by the selected phase is determined. At 314, a determination is made whether the baseband cancellation signal is adjusted for each phase of the plurality of phases. If the RF cancellation signal is not adjusted for each phase of the plurality of phases, processing returns back to 308. If the RF cancellation signal is adjusted with each phase, processing moves to 316 where a phase of the plurality of phases is determined which results in a power of the baseband receive signal at the victim radio 102 being below a threshold. At 318, an operating RF transmit signal is generated by the aggressor radio which is phase adjusted by the determined phase and amplitude adjusted by the determined amplitude to form an operating RF cancellation signal. The operating RF transmit signal may be a signal transmitted during normal operation and carry data to the remote station and not transmitted during a calibration process. At 320, the operating RF cancellation signal is output by the coupler and to the antenna of the victim radio concurrently with transmitting the operating RF transmit signal, where the operating RF cancellation signal reduces interference of the operating RF transmit signal at the antenna of the victim radio.

Figure 4:
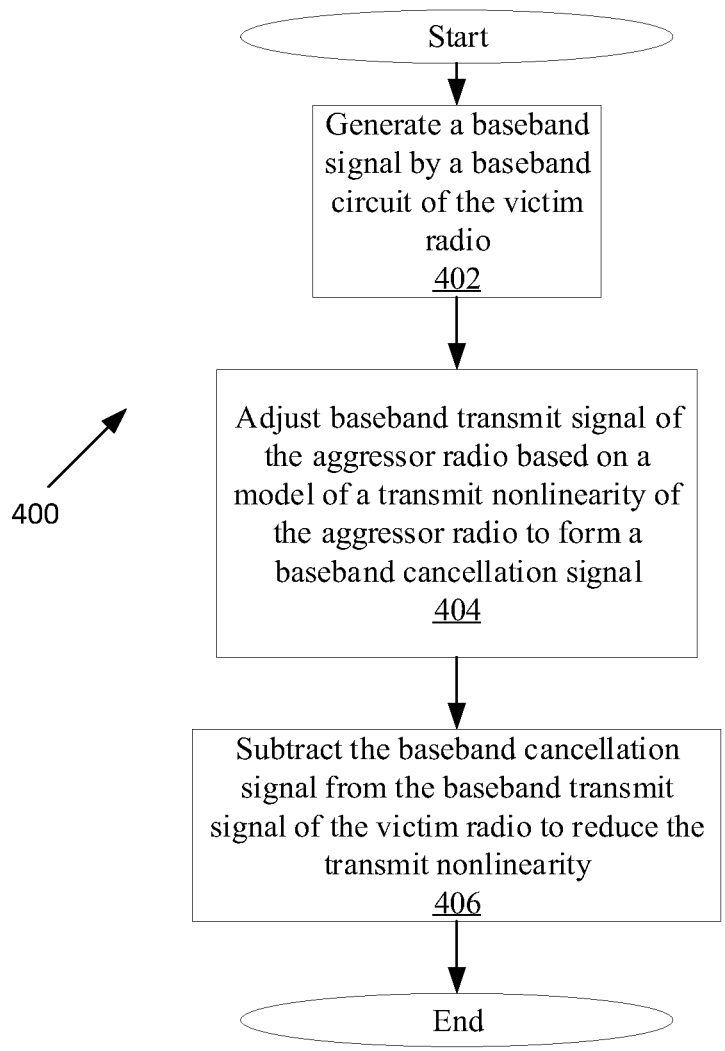
FIG. 4 is a flow chart of example processing associated with baseband interference cancellation in accordance with an embodiment.

FIG. 4 is a flow chart 400 of example baseband processing associated with interference cancellation in accordance with an embodiment. The baseband cancellation may cancel nonlinearities associated with an RF transmit signal transmitted by the aggressor radio 102 at the antenna 114 of the victim radio 102.

At 402, a baseband signal is generated by a baseband circuit of the victim radio. The baseband signal may be associated with a signal to be transmitted by the victim radio or received by the victim radio 102. At 404, a baseband transmit signal of the aggressor radio 104 is adjusted based on a model of a transmit nonlinearity of the aggressor radio to form a baseband cancellation signal. The model may be an AM-AM or AM-PM profile in an example. The baseband transmit signal may be input into the model which outputs the baseband transmit signal with nonlinearity of the RF circuit of the aggressor radio. At 406, the baseband cancellation signal is subtracted from the baseband transmit signal of the victim radio to reduce the transmit nonlinearity of the aggressor radio 102 when the victim radio transmits an RF transmit signal based on a result of the subtraction. The baseband signal of the victim radio may be a signal which is then upconverted to a RF transmit signal by the radio 102 for transmission. In some examples, the baseband cancellation signal may be filtered by a high pass filter before being subtracted from the baseband signal when the RF cancellation is also performed by the multi-radio system. The signal resulting from the subtraction may be provided to the RF circuit of the victim radio for transmission as an RF signal with reduced nonlinearities.

In an embodiment, a multi-radio system is disclosed. The multi-radio system comprises: a first radio; a second radio; wherein the first radio and the second radio are co-located on the multi-radio system; wherein the first radio is arranged to generate an RF transmit signal which is output by a first antenna of the first radio; and wherein the first radio comprises a radio frequency (RF) canceller arranged output a RF cancellation signal which couples with the RF transmit signal at a second antenna of the second radio to reduce interference from the RF transmit signal at the second antenna. In an example, the RF transmit signal of the first radio is generated from a baseband transmit signal of a baseband circuit of the first radio; the multi-radio system further comprising a baseband canceller arranged to receive the baseband transmit signal from the baseband circuit of the first radio and output a baseband cancellation signal to a subtractor circuit of the second radio arranged to subtract the baseband cancellation signal from a baseband signal at a baseband circuit of the second radio. In an example, the multi-radio system comprises further comprises a baseband cancellation signal generator circuit, arranged to receive the baseband transmit signal and apply a transmit nonlinearity model to the baseband transmit signal to generate the baseband cancellation signal. In an example, the multi-radio system further comprises a high pass filter arranged to filter the baseband cancellation signal prior to being provided to the subtractor. In an example, the first and second radio are co-located on a same integrated circuit, a same board, or a same platform. In an example, the multi-radio system further comprises a coupler arranged to couple at the second antenna the RF cancellation signal with the RF transmit signal, wherein the coupler is a printed circuit board (PCB) antenna or a transformer. In an example, the RF canceller is further arranged with a phase shifter and an amplitude adjuster, wherein the phase shifter is arranged to adjust a phase of a baseband transmit signal, and the amplitude adjuster is arranged to adjust an amplitude of the baseband transmit signal, the RF cancellation signal generated based on the baseband transmit signal with the adjusted phase and amplitude. In an example, a phase lock loop comprises the phase shifter and an upconverter to upconvert a frequency of the baseband transmit signal. In an example, the adjusted phase is a phase which results in a baseband signal down-converted from the RF transmit signal received at the victim radio having a power which is below a predetermined threshold. In an example, the first radio is an aggressor radio and the second radio is a victim radio. In an example, the second radio is arranged to receive at the second antenna a remote signal from a remote station, the RF cancellation signal, and the RF transmit signal concurrently. In an example, an isolation between the first antenna and the second antenna is higher than an isolation between the first antenna and a third antenna which outputs the RF cancellation signal. In an example, the system further comprises a third radio, the multi-radio system further comprising a coupler arranged to couple at the second antenna the RF cancellation signal with the RF transmit signal, wherein the coupler is an antenna of a multiple input multiple output (MIMO) antenna not being used by the third radio to transmit or receive signals.

In another embodiment, a method for interference cancellation in a multi-radio system having a first radio and second radio which are co-located on the multi-radio system is disclosed. The method comprises generating, by the first radio, an RF transmit signal which is output by a first antenna of an RF circuit; and outputting, by the first radio, an RF cancellation signal which couples with the RF transmit signal at a second antenna of the second radio to reduce interference from the RF transmit signal at the second antenna. In an example, the RF transmit signal is generated from a baseband transmit signal of a baseband circuit of the first radio, the method further comprising receiving, by the second radio, the baseband transmit signal of the first radio, generating, by the second radio, a baseband cancellation signal based on the baseband transmit signal of the first radio, and subtracting the baseband cancellation signal from a baseband signal at a baseband circuit of the second radio. In an example, the method further comprises receiving, by the second radio, the baseband transmit signal of the first radio and applying, by the second radio, a transmit nonlinearity model to the baseband transmit signal of the first radio to generate the baseband cancellation signal. In an example, the method further comprises filtering the baseband cancellation signal by a high pass filter prior to being provided to the subtractor circuit. In an example, the method further comprises coupling, by a coupler of the first radio, the RF cancellation signal with the RF transmit signal at the second antenna. In an example, the method further comprises adjusting, by the first radio, a phase of a baseband transmit signal, and adjusting, by the first radio, an amplitude of the baseband transmit signal, the RF cancellation signal generated based on the baseband transmit signal with the adjusted phase and amplitude. In an example, the adjusted phase is a phase which results in a baseband signal downconverted from the RF transmit signal received at the victim radio having a power which is below a predetermined threshold.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory

What is claimed is:

1. A multi-radio system comprising:
    a first radio having a first antenna and second antenna;
    a second radio;
    wherein the first radio and the second radio are co-located on the multi-radio system;
    wherein the first radio is arranged to generate an RF transmit signal which is output by the first antenna of the first radio;
    wherein the first radio comprises a radio frequency (RF) canceller arranged to output over air an RF cancellation signal which couples with a signal at an antenna of the second radio to reduce interference from the RF transmit signal at the antenna of the second radio; and
    wherein the second radio comprises a baseband canceller arranged to high pass filter a baseband cancellation signal based on a baseband transmit signal of the first radio prior to being provided to a subtractor circuit which subtracts the filtered baseband cancellation signal from a baseband receive signal of the second radio, the high pass filtering only being performed when the RF cancellation signal is output to reduce interference from the RF transmit signal in the signal at the antenna of the second radio.

2. The multi-radio system of claim 1, wherein the RF transmit signal of the first radio is generated from the baseband transmit signal of a baseband circuit of the first radio; the multi-radio system further comprising the baseband canceller arranged to receive the baseband transmit signal from the baseband circuit of the first radio and output the filtered baseband cancellation signal to the subtractor circuit of the second radio arranged to subtract the filtered baseband cancellation signal from the baseband receive signal at a baseband circuit of the second radio in an analog domain.

3. The multi-radio system of claim 2, further comprising a baseband cancellation signal generator circuit of the second radio, arranged to receive the baseband transmit signal and apply a transmit nonlinearity model to the baseband transmit signal to generate the baseband cancellation signal which is filtered and the filtered signal subtracted from the baseband receive signal, the nonlinearity model modeling an amplitude variation to phase variation (AM-PM) profile or AM-AM profile of an RF circuit of the first radio determined by digital predistortion and the baseband cancellation signal including added nonlinearities of the first radio indicated by the model.

4. The multi-radio system of claim 1, wherein the first and second radio are co-located on a same integrated circuit, a same board, or a same platform.

5. The multi-radio system of claim 1, further comprising a coupler arranged to couple the RF cancellation signal with the signal at the antenna of the second radio, wherein the coupler is a printed circuit board (PCB) antenna.

6. The multi-radio system of claim 1, wherein the RF canceller is further arranged with a phase shifter and an amplitude adjuster, wherein the phase shifter is arranged to adjust a phase of a baseband transmit signal, and the amplitude adjuster is arranged to adjust an amplitude of the baseband transmit signal based on a feedback from the second radio, the RF cancellation signal generated based on the baseband transmit signal with the adjusted phase and amplitude.

7. The multi-radio system of claim 6, wherein a phase lock loop comprises the phase shifter and an upconverter to upconvert a frequency of the baseband transmit signal.

8. The multi-radio system of claim 6, wherein the adjusted phase is a phase which results in the baseband receive signal from the second radio having a power which is below a predetermined threshold.

9. The multi-radio system of claim 1, wherein the first radio is an aggressor radio and the second radio is a victim radio.

10. The multi-radio system of claim 1, wherein the second radio is arranged to receive at the antenna a remote signal from a remote station, the RF cancellation signal, and the RF transmit signal concurrently.

11. The multi-radio system of claim 1, wherein an isolation between the first antenna and the antenna of the second radio is higher than an isolation between the first antenna and a third antenna which outputs the RF cancellation signal.

12. The multi-radio system of claim 1, wherein the system further comprises a third radio, the multi-radio system further comprising a coupler arranged to couple the RF cancellation signal with the signal at the antenna of the second radio, wherein the coupler is an antenna of a multiple input multiple output (MIMO) antenna not being used by the third radio to transmit or receive signals.

13. A method for interference cancellation in a multi-radio system having a first radio and second radio which are co-located on the multi-radio system, the method comprising:
generating, by the first radio having a first antenna and a second antenna, an RF transmit signal which is output by the first antenna of the first radio; and
outputting, by the first radio by the second antenna, an RF cancellation signal over air which couples with a signal at an antenna of the second radio to reduce interference from the RF transmit signal at the antenna of the second radio;
high pass filtering, by the second radio, a baseband cancellation signal based on a baseband transmit signal of the first radio; and
subtracting, by the second radio, the filtered baseband cancellation signal from a baseband receive signal of the second radio, the high pass filtering only being performed when the RF cancellation signal is output to reduce interference from the RF transmit signal in the signal at the antenna of the second radio.

14. The method of claim 13, wherein the RF transmit signal is generated from the baseband transmit signal of a baseband circuit of the first radio, the method further comprising receiving, by the second radio, the baseband transmit signal of the first radio, generating, by the second radio, the baseband cancellation signal based on the baseband transmit signal of the first radio, and subtracting the filtered baseband cancellation signal from the baseband receive signal at a baseband circuit of the second radio in an analog domain.

15. The method of claim 14, further comprising receiving, by the second radio, the baseband transmit signal of the first radio and applying, by the second radio, a transmit nonlinearity model to the baseband transmit signal of the first radio to generate the baseband cancellation signal which is filtered and the filtered signal subtracted from the baseband receive signal, the nonlinearity model modeling an amplitude variation to phase variation (AM-PM) profile or AM-AM profile of an RF circuit the first radio determined by digital predistortion and the baseband cancellation signal including added nonlinearities of the first radio indicated by the model.

16. The method of claim 13, further comprising coupling, by a coupler of the first radio, the RF cancellation signal with the RF transmit signal at the antenna of the second radio.

17. The method of claim 13, further comprising adjusting, by the first radio, a phase of a baseband transmit signal, and adjusting, by the first radio, an amplitude of the baseband transmit signal, the RF cancellation signal generated based on the baseband transmit signal with the adjusted phase and amplitude.

18. The method of claim 17, wherein the adjusted phase is a phase which results in the baseband receive signal from the second radio having a power which is below a predetermined threshold.

* * * * *